(12) United States Patent
Yeh

(10) Patent No.: US 6,581,483 B1
(45) Date of Patent: Jun. 24, 2003

(54) AIR BUFFER TYPE APPARATUS FOR KEY DURABILITY TESTING

(75) Inventor: Chi-Pin Yeh, TaiNan (TW)

(73) Assignee: Darfon Electronics Corp., Tao Yuan (TW)

( * ) Notice: Subject to any disclaimer, the term of this patent is extended or adjusted under 35 U.S.C. 154(b) by 196 days.

(21) Appl. No.: 09/631,635

(22) Filed: Aug. 2, 2000

(30) Foreign Application Priority Data

Aug. 6, 1999 (TW) ...................................... 88213270 U

(51) Int. Cl.[7] .............................................. G01M 19/00
(52) U.S. Cl. ..................................................... 73/865.3
(58) Field of Search ........................... 73/865.3, 12.07, 73/12.09, 12.12; 400/180, 181, 185, 472, 480

(56) References Cited

U.S. PATENT DOCUMENTS 4,441,833 A * 4/1984 Hasenbalg ................... 400/180
4,543,000 A * 9/1985 Hasenbalg ................... 400/180
5,827,983 A * 10/1998 Ortoli ......................... 73/865.3
5,879,088 A * 3/1999 English ........................ 400/472

FOREIGN PATENT DOCUMENTS

| EP | 0201259 | * 11/1986 | .................. 400/180 |
| WO | WO8301417 | * 4/1983 | .................. 400/180 |

* cited by examiner

Primary Examiner—Robert Raevis
(74) Attorney, Agent, or Firm—Troxell Law Office PLLC

(57) ABSTRACT

An air buffer type apparatus for key durability testing upon a keyboard is provided to carry out a durability test that can mimic a real finger typing operation. The apparatus includes a driving unit, a buffer unit and a depressing unit. The driving unit has a closed air space with a constant internal air pressure. The depressing unit is driven by the driving unit and further includes a plurality of abreasting air cylinders. Each air cylinder includes a pressure zone and a depressing head for depressing the key in the testing. The buffer unit can provide pressure buffering during the key pressing operation.

9 Claims, 5 Drawing Sheets

AIR BUFFER TYPE APPARATUS FOR KEY DURABILITY TESTING

FIELD OF THE INVENTION

This invention relates to an air buffer type apparatus for key durability testing and more particularly to a testing apparatus that can effectively simulate a real key stroke operation.

BACKGROUND OF THE INVENTION

Key durability testing is one of important quality control items for keyboards used in computers, notebook computers and the like. The main purpose of such testing is to check the durability of the spring or the loading rubber installed below the key. Conventionally, testing apparatus in the art can be generally classified into a cam type and a pneumatic type.

FIG. 1 shows the structure of a conventional cam type key durability testing apparatus. It includes a cam 10, a linkage bar 11 and a movable rack 13 for generating vertical up and down displacements. As shown, a plurality of depression bars 131 are provided below the movable rack 13 and above the testing keys 200. When the cam 10 is activated to rotate, the depression bars 131 will be moved downward to further depress the key top 100 and the loading rubber 101 of the key 200. Hence, by means of the reciprocal motion of the depression bars 131 driven by the cam 10, key durability test may thus be preformed. However, the displacement of the depression bars 131 in the above structure is fixed. To get a best test result, the lowest position of the depression bars 131 should match the ideal lowest position of the key 200. However, in an actual testing, the preferred situation would seldom be achieved. For instance, it could happen that, at the moment of the key 200 reaching the lowest position, the depression bar 131 does not stop but keeps moving downward to produce a maximum test pressure greater than a preset value. Such a situation would render a lower durability result than it should be. In another example, the depression bar 131 might reach its lowest position before the key 200 can mimic a real lowest depression position, so that a fake higher durability result may be obtained.

Moreover, the fixed displacement operation may result in a state shift of the apparatus after each operation. Therefore, it can be foreseen that a tedious and time-consuming machine adjustment is required before each test operation. Furthermore, the operation obeying fixed displacement guideline does not accurately simulate human typing operation by fingers. A normal finger action might be better mimicked by a maximum resistant force mode; i.e., the maximum depressing force is fixed during finger typing. Under such a mode, the depression magnitude of each typing depends mainly upon the resistance force provided by the loading rubber 101. That is to say that the lowest depression position by the finger depends mainly upon the reaction force of the key 200.

FIG. 2 illustrates a conventional pneumatic key durability testing apparatus. The apparatus as shown has a plurality of air cylinders 21 mounted on a fixed rack 20. Each of the air cylinders 21 can communicate with a common air compressor (not shown in the figure) through a respective hose 23. While in use, the air compressor pumps compressed air into each air cylinder 21 to move the respective piston rod 211 downward for further depressing the respective key 200. In each air cylinder 21, a spring (not shown in the figure) is included to push the piston rod 211 upward for completing a testing cycle, after the pressure provided by the air compressor is removed.

It is obvious that this pneumatic kind of testing apparatus requires an air compressor to perform the reciprocal test forcing. Thus, the equipment cost of the testing apparatus is much higher than that for the previous apparatus. Moreover, the usage of only a single air compressor induces an evenness problem upon distribution of application air pressure, because a plurality of air cylinders at different distances need to be fed evenly for achieving a better testing outcome. Furthermore, the spring located inside the air cylinder 21 for providing lifting force may make the downward air pressure less evenly and less accurately while being applied upon the key. The spring is also prone to resilient fatigue after long testing time of repeated reciprocal movement, and to making downward pressure applied upon the key greater than the preset value. All these disadvantages do inevitably lead to negative impacts upon test accuracy.

SUMMARY OF THE INVENTION

It is an object of this invention to provide an air buffer tape apparatus for key durability testing for effectively simulating actual key stroke operation to obtain accurate test results.

It is another object of this invention to provide an air buffer type apparatus for key durability testing that mimics accurate finger performance by using a closed air chamber to communicate with a pressure chamber located at the depressing end with a predetermined fixed displacement.

It is a further object of this invention to provide an air buffer type apparatus for key durability testing that mimics constant typing pressure situation by using an elastic closed air chamber to provide a constant pressure upon a piston rod for further applying constant pressure on the key.

The air buffer type apparatus for key durability testing according to this invention aims mainly at performing durability test upon a keyboard having a plurality of keys. It includes a driving unit for fixed displacement control, a buffer unit and a depressing unit.

The buffer unit is a closed air chamber which maintains substantially a constant internal air pressure to provide a buffer space for any key depression.

The depressing unit, driven by the driving unit, includes a plurality of air cylinders, in which each air cylinder communicates with the buffer unit through a hose to utilize the buffer unit as a buffer mechanism for the key-depressing operation. Further, each of the air cylinders has a pressure chamber which is formed in a cylinder and links to the buffer unit by means of the hose, and a depressing head in the form of a piston with a piston rod extending outside the air cylinder for depressing the key.

When in operation, the driving unit drives the depressing unit and the air cylinders to move reciprocally up and down at a constant displacement. During the up and down movement, the depressing head can press the key with a constant pressure. During the testing even at the point that the key poses at its lowest position, a substantial constant pressure for the depressing head to press upon the key can be still maintained by the buffer unit that can absorb any possible pressure variation during the testing. Under such an arrangement, this apparatus of the present invention may perform effective and accurate key stroke simulation.

In an embodiment of the present invention, the driving unit can be a cam driving mechanism.

In an embodiment of the present invention, the buffer unit may include at least one buffer zone which provides a total volume larger than the total volume difference of the air cylinders during the testing.

In an embodiment of the present invention, the buffer unit may also include a compression means for pumping compressed air into the buffer unit when the air pressure therein falls below a preset level.

In an embodiment of the present invention, the buffer unit may further include a pressure relief valve for releasing air pressure in the buffer unit.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 3:
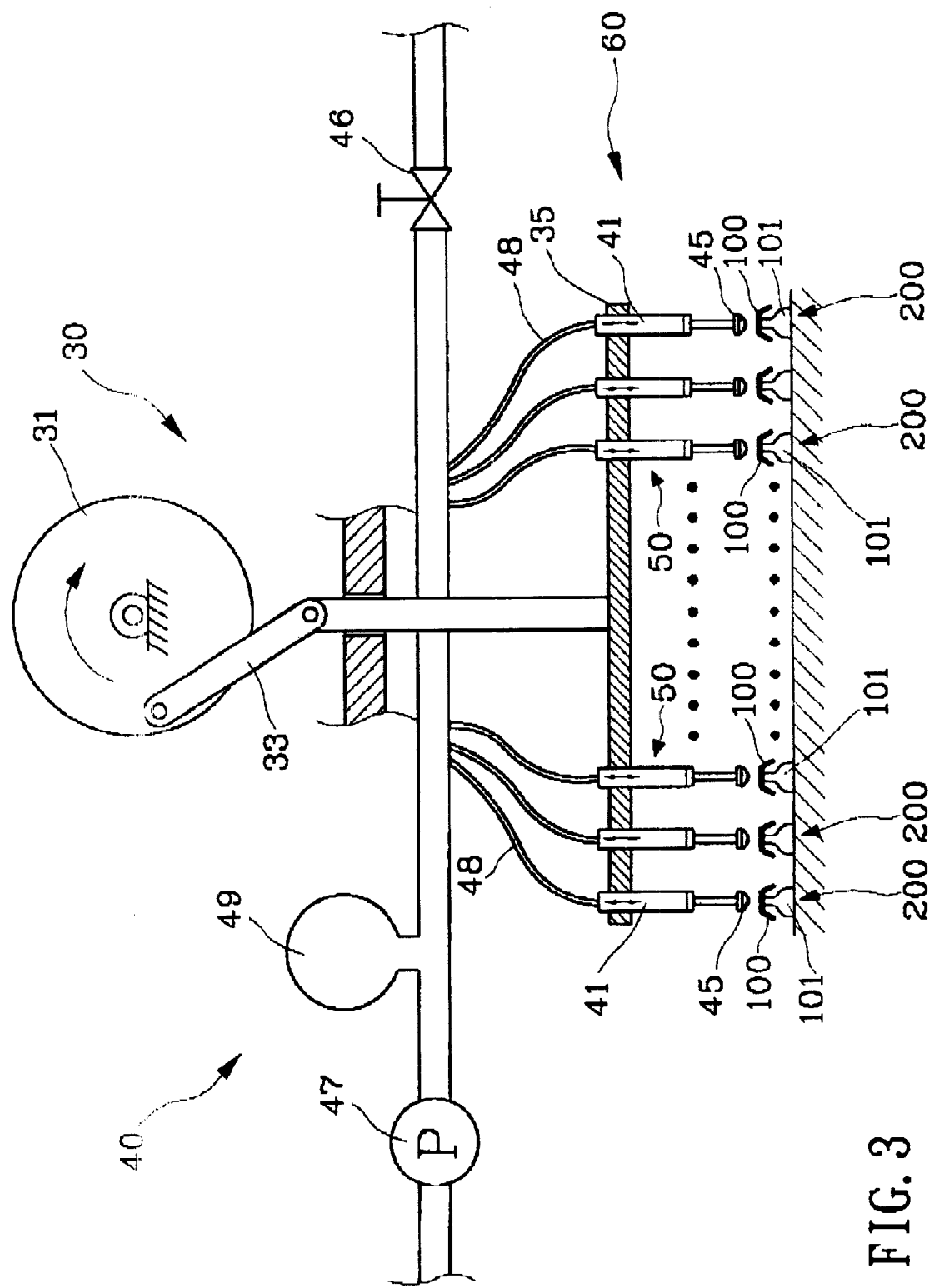
FIG. 3 is a schematic view of an embodiment of this invention.

Referring now to FIG. 3, the air buffer key durability apparatus of this invention is designed for testing durability of a keyboard which has a plurality of keys 200 mounted therein. The apparatus includes a driving unit 30, a buffer unit 40 and a depressing unit 60.

The driving unit 30 provides control and driving force for a reciprocal motion with a fixed stroke displacement. It may be embodied to include a cam 31 and a transmission linkage bar 33. It may also be embodied as a liquid pressure driving means, a pneumatic driving means and the like.

In the embodiment shown in FIG. 3, the driving unit 30 uses the cam 31, the linkage bar 33 and a movable rack 35 to convert rotation of the driving unit 30 into an up-and-down type of reciprocal movement with a fixed stroke displacement for the depressing unit 60.

The depressing unit 60 includes a plurality of abreasting air cylinders 50 engaged with the movable rack 35 for moving along with the rack 35. Each of the air cylinders 50 has hose 48 to communicate with the buffer unit 40 which serves as a buffer means for depressing operation. As shown, each air cylinder 50 further includes a pressure chamber 41 and a piston-type depressing head 45.

The pressure chamber 41 formed in the cylinder 50 further includes one end engaging with the hose 48 for airy linking to the buffer unit 40. The air pressure in the pressure chamber 41 can be thus maintained substantially the same as the air pressure in the buffer unit 40. The hose 48 is preferably embodied as a pipe made of a resilient and soft material.

Figure 5:
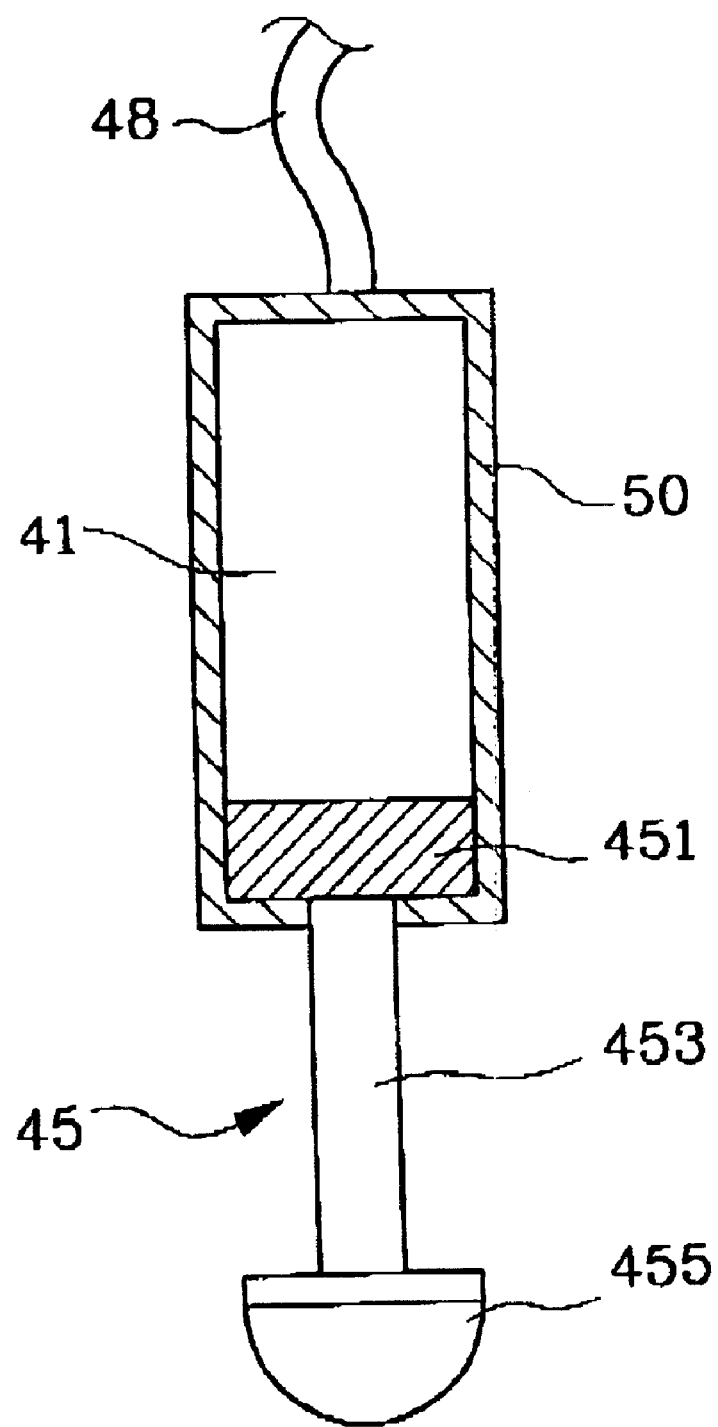
FIG. 5 is a sectional view of an air cylinder and a depressing head of this invention.

Referring now to FIG. 5, the depressing head 45 is a piston type member having a piston head 451 movable in the pressure chamber 41, a rod 453 having one end engaging with a bottom of the piston head 451 and another end extending out of the air cylinder 51, and a depressing end 455 engaged with another end of the rod 453. The depressing end 455 may be made of rubber or the like.

The buffer unit 40 can be a closed air chamber for maintaining a constant air pressure inside to provide a buffer space aiming at the moment while the depressing head 45 pressing the key 200. It preferably includes at least one buffer zone 49, a compressing means 47 and a relief valve 46.

In a preferred embodiment of this invention, the buffer zone 49 can have a much larger volume than the sum of volume variation of the pressure chamber 41 to meet testing variation requirement, especially at the moment when the air cylinder 50 pushes the piston head 451 downward.

Figure 1:
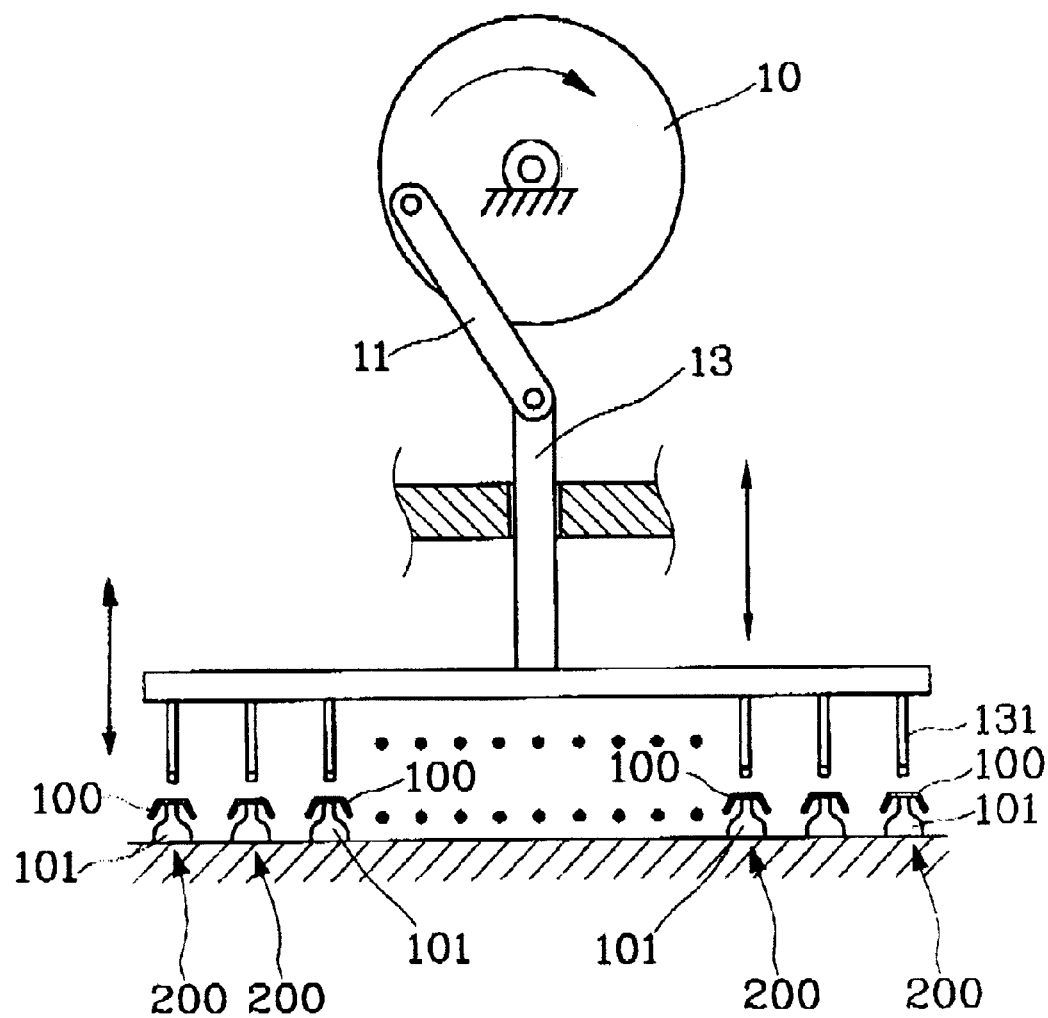
FIG. 1 is a schematic view of a conventional key durability testing apparatus.
Figure 2:
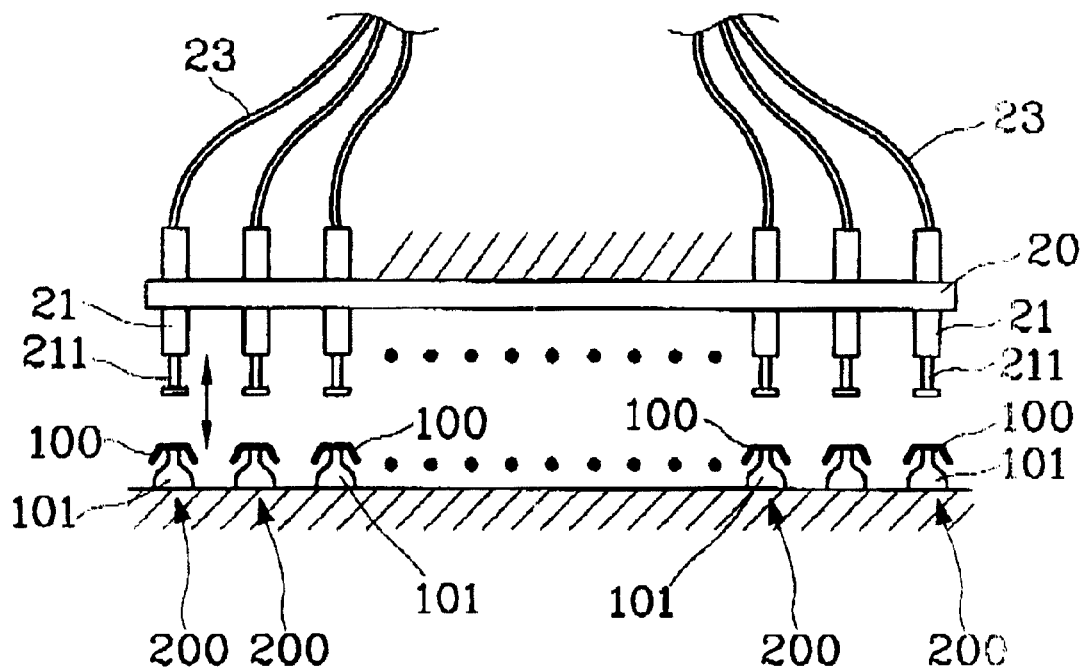
FIG. 2 is a schematic view of another conventional key durability testing apparatus.

In the present invention, the compressing means 47 is used to pump compressed air into the buffer unit 40 when the internal pressure thereof is lower than a preset level. Such an arrangement serves different function by comparing with the conventional pneumatic type testing apparatus shown in FIG. 2. In the testing apparatus of FIG. 2, the air compressor has to pump compressed air at every testing operation for providing driving energy. On the other hand, in this invention, the buffer unit 40 and the pressure chamber 41 are separate and each of them can form an individual closed space. The compressing means 47 will be activated to pump compressed air into the buffer unit 40 only when air pressure in the buffer unit 40 falls below a preset level. This pumping operation might happen only once in thousands of key depressing cycles. The pumping frequency of the compressing means 47 depends mainly upon the air tightness of the system.

The relief valve 46 of the present invention is to release the air pressure of the buffer unit 40 when desired.

When in use, the driving unit 30 moves the depressing unit 60 and the air cylinders 50 up and down reciprocally at a fixed displacement; so that the depressing head 45 can apply a constant pressure on the key 200. At the moment that the key 200 reaches the lowest position and the air cylinder 50 hasn't reach its dead end point, the air cylinder 50 can still continuously remain contact with the depressing head 45 without depressing the key 200 downward further, for the buffer zone 49 has a much large volume than the volume variation in the pressure chamber 41; so that the depressing head 45 may continually press upon the key 200 with almost the same pressure in the final stage of a approaching stroke in a depression cycle. Such a mechanism arrangement also renders then an upward forcing of the depressing head 45 to prevent the key 200 from being further pressed downward over its lowest position. Hence, it can effectively simulate the real key stroke operation.

Through the closed air chamber formed in the buffer unit 40, a constant compressible body is formed to communicate with the pressure chamber 41. Therefore, a better key stroke operation mimicking a real finger typing can be simulated, even under the presetting o a fixed displacement movement.

The embodiment set forth above uses a large volume buffer unit to provide buffer function. In another embodiment of the present invention, such a buffer function can be equivalently replaced with a buffer zone made of deformable resilient material for absorbing volume change in the pressure chamber 41 and also capable of maintaining a constant air pressure in the closed chamber.

Figure 4:
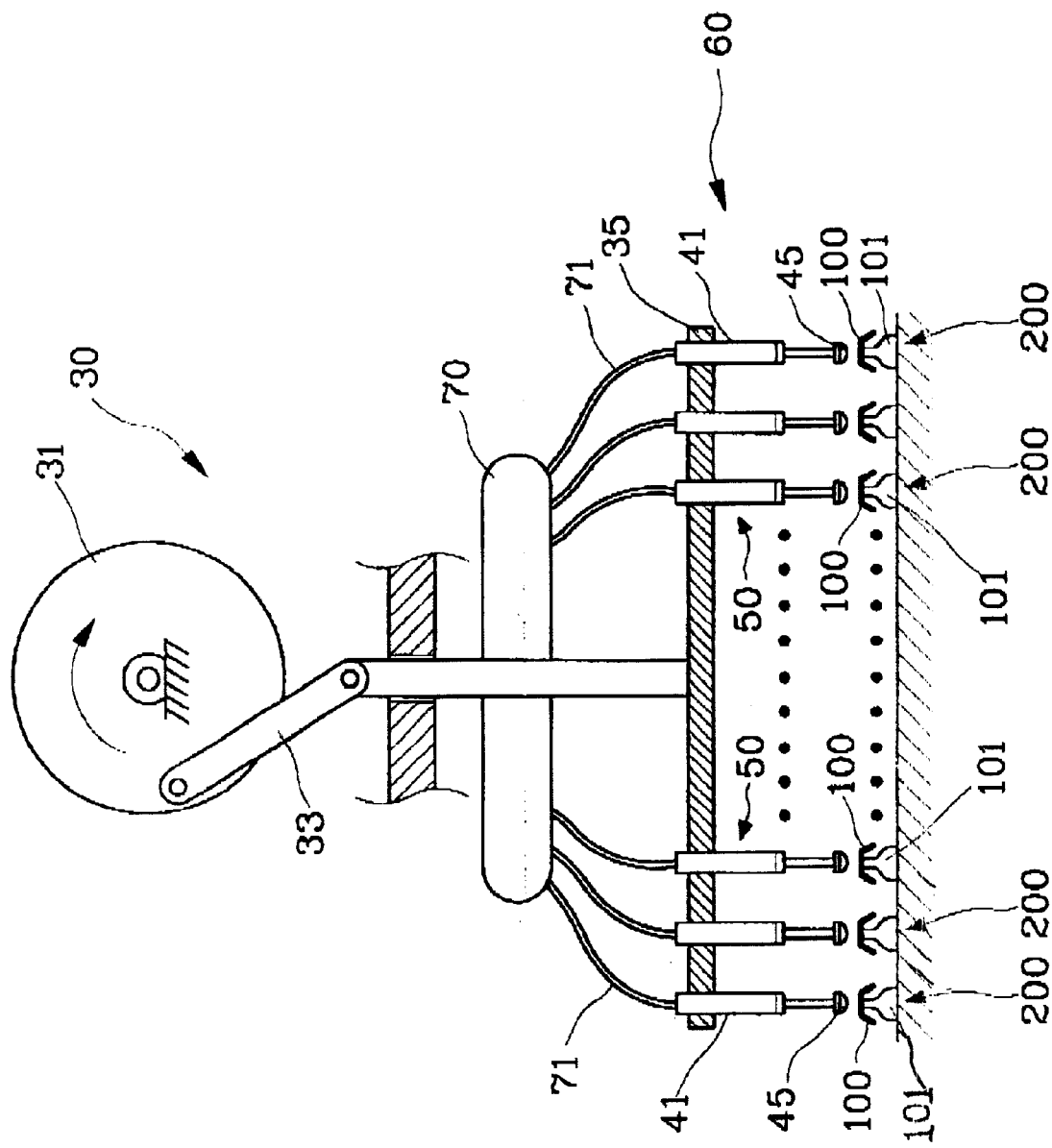
FIG. 4 is a schematic view of another embodiment of this invention.

Generally, the embodiment shown in FIG. 4 is largely constructed like the one shown in FIG. 3. However, it provides a piping network 70 to replace the buffer unit 40 of the previous embodiment. The piping network 70 can be made of any suitable rigid material and has a much larger volume than the total combined volume variation in the pressure chamber 41 during the depressing process. Hence, pressure variation in the pressure chamber 41 during the depressing process can be neglected and the air pressure in the pressure chamber may be deemed constant.

On the other hand, the piping network 70 may also be made of any suitable elastic material for forming an expandable space to absorb volume variation of the pressure chamber 41 during the depressing process. In accordance with the present invention, it is preferable to have a plurality of hoses 71 made of elastic and soft material. Each of the hoses 71 communicates the pressure chamber 41 with the piping network 70 that maintains a constant air pressure during the pressing process. In this embodiment, the buffer zone, relief valve and compressing means may also be applied and linked to the piping network 70. The function and operation of this embodiment are largely the same as the embodiment shown in FIG. 3.

It may thus be seen that the objects of the present invention set further herein, as well as those made apparent from the foregoing description are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An air buffer apparatus for durability testing keys of a keyboard, and comprising:

a) a depressing unit including a movable rack having a plurality of air cylinders mounted thereon, each air cylinder including a piston head freely movable in a pressure chamber, a piston rod extending from the piston head exteriorly of the air cylinder and a depressing end on the piston rod;

b) a driving device connected to the movable rack for simultaneously reciprocating the movable rack and the plurality of air cylinders towards and away from a keyboard under test; and c) an air pressure system including a closed air space for supplying a constant air pressure to the plurality of air cylinders, whereby, the depressing ends of the piston rods contact keys of a keyboard under test with a constant pressure.

2. The air buffer apparatus of claim 1 wherein the depressing ends are made of rubber.

3. The air buffer apparatus of claim 1 wherein the driving device is a cam drive mechanism.

4. The air buffer apparatus of claim 1 wherein the driving device includes a rotatable wheel with an eccentrically mounted link bar connected to the movable rack.

5. The air buffer apparatus of claim 1 wherein the air pressure system includes an air buffer reservoir.

6. The air buffer apparatus of claim 5 further comprising a compressor and a relief valve to maintain air pressure in the air pressure system within pre-set limits.

7. The air buffer apparatus of claim 1 wherein the air pressure system includes a piping network having a volume greater than a volume of all of the plurality of air cylinders.

8. The air buffer apparatus of claim 7 wherein the piping network is made of elastic material.

9. The air buffer apparatus of claim 1 wherein the air pressure system has a buffer zone with a volume greater than a total volume of the plurality of air cylinders.

* * * * *